US012791984B2

(12) United States Patent
Miyauchi

(10) Patent No.: US 12,791,984 B2
(45) Date of Patent: Nov. 10, 2026

(54) ANALOG ELECTRONIC TIMEPIECE

(71) Applicant: Norio Miyauchi, Koga (JP)

(72) Inventor: Norio Miyauchi, Koga (JP)

( * ) Notice: Subject to any disclaimer, the term of this patent is extended or adjusted under 35 U.S.C. 154(b) by 271 days.

(21) Appl. No.: 18/699,587

(22) PCT Filed: Mar. 22, 2022

(86) PCT No.: PCT/JP2022/013004
§ 371 (c)(1),
(2) Date: Apr. 8, 2024

(87) PCT Pub. No.: WO2023/062857
PCT Pub. Date: Apr. 20, 2023

(65) Prior Publication Data

US 2024/0402652 A1 Dec. 5, 2024

(30) Foreign Application Priority Data

Oct. 13, 2021 (JP) ................................ 2021-167842

(51) Int. Cl.
*G04C 3/14* (2006.01)
*G04R 20/02* (2013.01)
*G04R 20/08* (2013.01)

(52) U.S. Cl.
CPC ............... *G04C 3/14* (2013.01); *G04R 20/02* (2013.01); *G04R 20/08* (2013.01)

(58) Field of Classification Search
CPC ........................................................ G04C 3/14
See application file for complete search history.

(56) References Cited

U.S. PATENT DOCUMENTS 4,516,863 A 5/1985 Ikehata
6,025,660 A 2/2000 Guerin
(Continued)

FOREIGN PATENT DOCUMENTS

JP 54-14091 A 11/1979
JP 55-4554 A 1/1980
(Continued)

OTHER PUBLICATIONS

International Search Report of PCT/JP2022/013004 dated Apr. 26, 2022.

*Primary Examiner* — Edwin A. Leon
*Assistant Examiner* — Jason M Collins
(74) *Attorney, Agent, or Firm* — MATTINGLY & MALUR, PC

(57) ABSTRACT

A sweep motion second function is added to an analog electronic timepiece. Angular velocity control of a stepping motor for a seconds hand in which a rotor is provided is executed. A stepping motor model calculates an equation of motion and a circuit equation regarding the stepping motor in real time. Sweep drive is executed with a sweep drive pulse width generated through performing a proportional integral of the difference between angular velocity set to π (radians/second) and angular velocity of the stepping motor model. Correction of the load torque is executed using the rotor angle at the zero crossing of a back electromotive voltage generated across a coil of the stepping motor and the calculated angular velocity. A DC current is applied to coils disposed at bridges of a yoke and the detent torque of the stepping motor is reduced. Time lag is corrected using a GPS time signal.

4 Claims, 8 Drawing Sheets

(56) References Cited

U.S. PATENT DOCUMENTS

| | | | | |
|---|---|---|---|---|
| 7,518,956 | B1 * | 4/2009 | Hansel | G04B 19/262 368/15 |
| 2005/0041535 | A1 * | 2/2005 | Hiraya | G04F 8/00 368/204 |
| 2009/0086581 | A1 * | 4/2009 | Suizu | G04C 3/14 368/10 |
| 2013/0003507 | A1 * | 1/2013 | Billet | G04F 7/0866 368/106 |
| 2013/0162060 | A1 * | 6/2013 | Fukushima | G04C 3/14 310/37 |
| 2015/0117165 | A1 * | 4/2015 | Stotz | G04C 17/00 368/228 |
| 2016/0327915 | A1 * | 11/2016 | Katzer | G04C 3/002 |
| 2017/0279395 | A1 * | 9/2017 | Saito | H02K 37/12 |
| 2020/0081404 | A1 * | 3/2020 | Maeda | H02P 29/40 |

FOREIGN PATENT DOCUMENTS

| | | | |
|---|---|---|---|
| JP | 59-67489 | A | 4/1984 |
| JP | 10-28367 | A | 1/1998 |
| JP | 2000-295828 | A | 10/2000 |
| JP | 2005-024319 | A | 1/2005 |
| JP | 2008-278568 | A | 11/2008 |
| JP | 2013-122390 | A | 6/2013 |
| JP | 2014-095641 | A | 5/2014 |
| JP | 2015-007584 | A | 1/2015 |
| JP | 2017-046393 | A | 3/2017 |

* cited by examiner (a)

(b)

(a)

(b)

ANALOG ELECTRONIC TIMEPIECE

TECHNICAL FIELD

The present invention relates to an analog electronic timepiece having a step motion second function and a sweep motion second function.

BACKGROUND ART

Description will be made about methods in which step drive and sweep drive of a stepping motor mounted in a conventional analog electronic timepiece are executed in the analog electronic timepiece.

A configuration diagram of the stepping motor of the conventional analog electronic timepiece, illustrated in FIG. 9, will be described. A conventional stepping motor 9 is configured from a stepping motor 91 that includes a stator 91*a* composed of a coil 91*e* and a yoke 91*b* given a pair of slits 91*c* and a pair of inner notches 91*d* and does not have the detent torque, and a stepping motor 92 that includes a stator 92*a* composed of a coil 92*e* and a yoke 92*b* given a pair of slits 92*c* and a pair of inner notches 92*d* and does not have the detent torque. The stepping motor 91 and the stepping motor 92 share a rotor 93.

First, the step drive of the stepping motor 9 will be described. The magnetic pole direction of the rotor 93 is a direction 93*a*. The coil 91*e* is energized and subsequently the coil 92*e* is energized. Thereafter, the energization of the coil 91*e* is stopped and subsequently the coil 91*e* is energized in the reverse direction. Thereafter, the energization of the coil 92*e* is stopped and subsequently the coil 92*e* is energized in the reverse direction. Thereafter, the energization of the coil 91*e* is stopped and subsequently the energization of the coil 92*e* is stopped. Thereafter, the coil 92*e* is energized in the reverse direction for a short time. Through the above operation, the rotor 93 makes step rotation by 360 degrees in one second and the step movement of the seconds hand by one second is caused on the basis of a reduction gear train ratio of 1/60.

Next, the sweep drive of the stepping motor 9 will be described. The magnetic pole direction of the rotor 93 is the direction 93*a*. The coil 91*e* is energized by a continuous pulse and subsequently the coil 92*e* is energized by a continuous pulse. Thereafter, the energization of the coil 91*e* is stopped and subsequently the coil 91*e* is energized by a continuous pulse in the reverse direction. Thereafter, the energization of the coil 92*e* is stopped and subsequently the coil 92*e* is energized by a continuous pulse in the reverse direction. Thereafter, the energization of the coil 91*e* is stopped and subsequently the coil 91*e* is energized by a continuous pulse. Through the above operation, the rotor 93 makes sweep rotation by 360 degrees in one second and the sweep movement of the seconds hand by one second is caused on the basis of a reduction gear train ratio of 1/60.

The structure of a conventional stepping motor will be described with a plan view (a) and a sectional view along line A-A regarding the conventional stepping motor, illustrated in FIG. 7. The conventional stepping motor 7 is configured from a rotor 70 formed of a permanent magnet 70*a* with two poles and a stator 71 composed of a yoke 72 magnetically coupled to the permanent magnet 70*a* and a coil 73. In the yoke 72, a pair of steps 75*a* and 75*b* are formed in a detent torque generating part 75 in such a manner as to face a rotor hole 74.

A conventional rotor illustrated in FIG. 8 will be described. The conventional rotor 8 is composed of a rotor shaft 8*a*, a pinion 8*b*, and a permanent magnet 8*c* disposed on the rotor shaft 8*a*.

PRIOR ART DOCUMENT

Patent Documents

Patent Document 1: JP-2013-122390-A
Patent Document 2: JP-2017-046393-A

Non-Patent Document

Non-patent Document 1: Akira Nikaido et al., The Institute of Electrical Engineers of Japan, MAG-77-23, (1977)

SUMMARY OF THE INVENTION

Problem to be Solved by the Invention

However, the conventional analog electronic timepiece involves a problem in the absence of shock resistance and the manufacturing cost because the two stepping motors that do not have the detent torque need to be used. Moreover, the sweep drive is open-controlled by the continuous pulse, and therefore involves a drawback that stability does not exist in the angular velocity of $2\pi$ (radians/second) regarding the rotor.

Means for Solving the Problem

In an analog electronic timepiece that has a step motion second function and a sweep motion second function, and executes step drive and sweep drive of a stepping motor configured from a rotor formed of a permanent magnet with two poles and a stator including a monolithic plate-shaped yoke having a rotor hole that the rotor enters, the yoke being magnetically coupled to the rotor, and a coil fixed to the yoke, in which the sweep motion second function is achieved by executing the sweep drive of the stepping motor by angular velocity control based on a stepping motor model. Load torque of the stepping motor model is corrected at every 180 degrees using angular velocity, the angular velocity being calculated by the stepping motor model, and a rotor angle at zero crossing of a back electromotive voltage generated across the coil.

Detent torque reducing coils for reducing detent torque are disposed at bridges near the rotor hole of the stator of the stepping motor, and a DC current is applied to the detent torque reducing coils and the detent torque is reduced at the time of the sweep drive.

The rotor of the stepping motor has an inertia.

The stepping motor is a stepping motor in which the yoke of the stepping motor includes a detent torque part including a structure that generates detent torque and a yoke part excluding the detent torque part, and the detent torque part is thinner than the yoke part and is located at a center of the yoke part in the thickness direction of the yoke part.

Immediately after the sweep motion second, a GPS time signal or a long-wave time signal is received and deviation of a seconds hand is corrected.

Advantage of the Invention

Step motion second and stable sweep motion second of the seconds hand can be achieved.

MODE FOR CARRYING OUT THE INVENTION

An embodiment of the present invention will be described in detail below based on the drawings.

Embodiment

Figure 1:
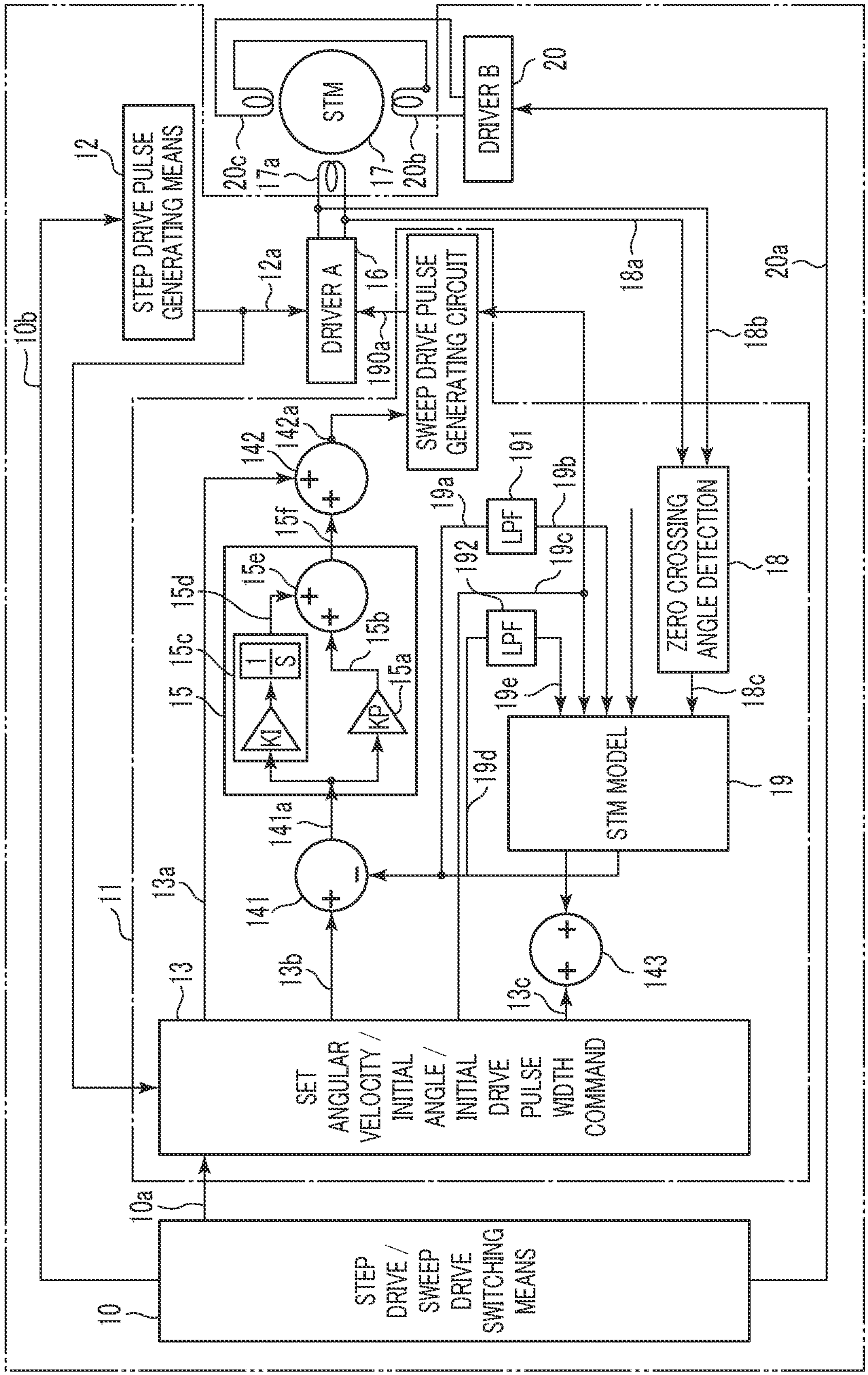
FIG. 1 is a drive circuit diagram of a stepping motor according to the present invention.
Figure 2:
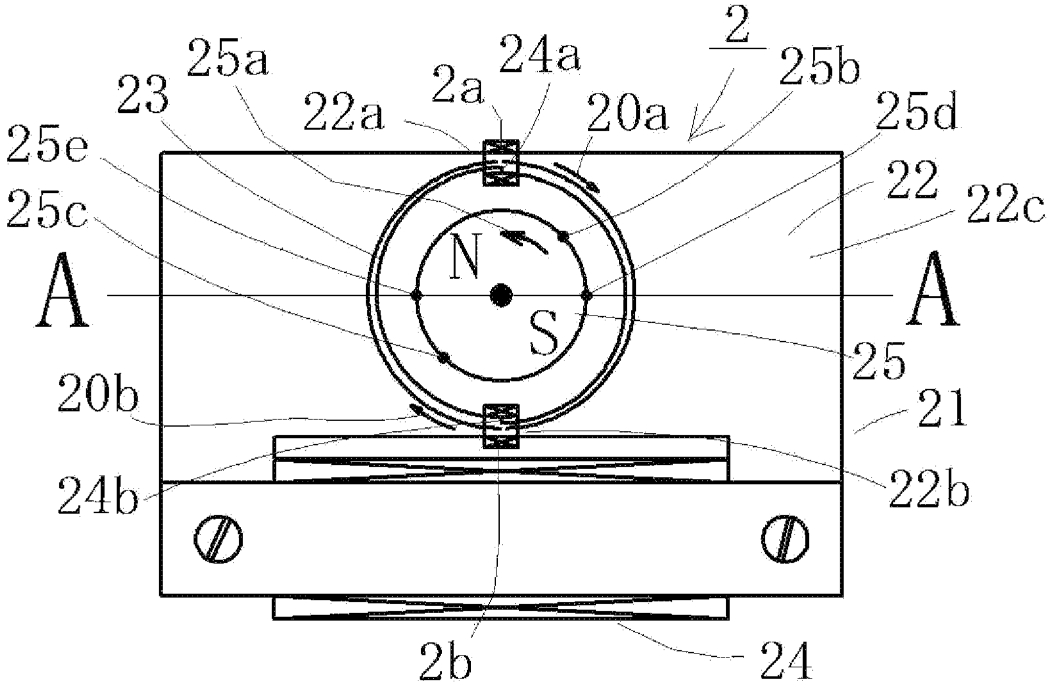
FIG. 2 is a plan view (a) and a sectional view (b) along line A-A regarding the stepping motor according to the present invention.
Figure 2:
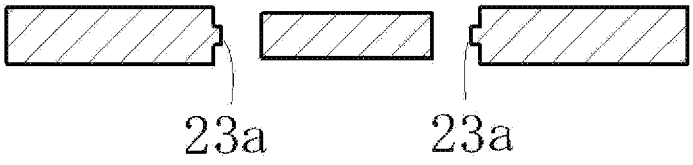
Figure 6:
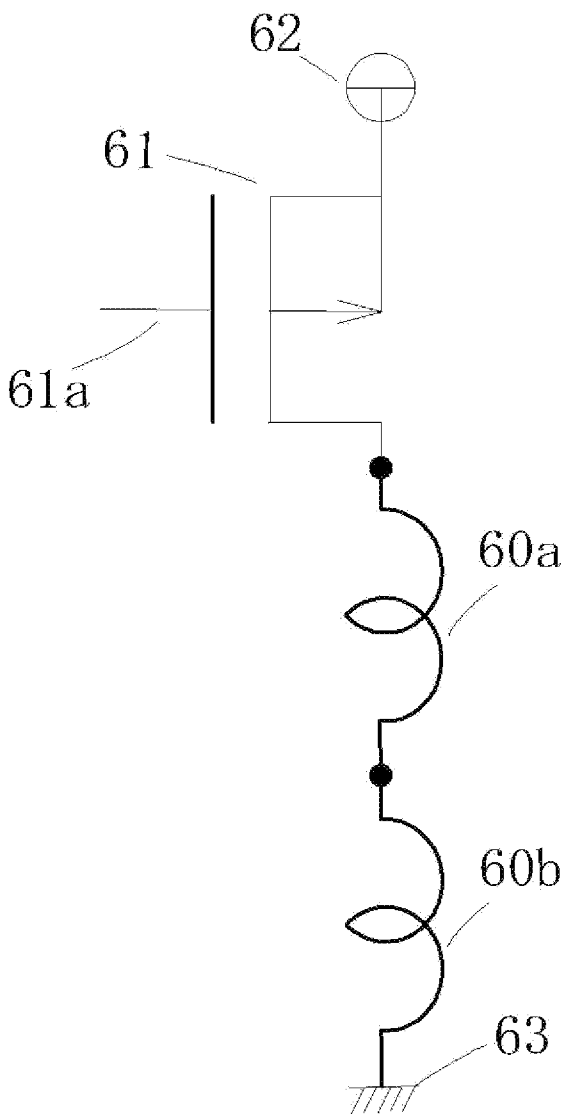
FIG. 6 is a driver diagram of detent torque reducing coils according to the present invention.

In FIG. 2, a plan view (a) and a sectional view (b) along line A-A regarding a stepping motor according to the present invention are illustrated. The stepping motor according to the present invention is configured from a rotor 25 formed of a permanent magnet with two poles and a stator 21 composed of a coil 24 and a yoke 22. A detent torque part 23 of the yoke 22 is formed (23*a*) to be thinner than a yoke part 22*c* at the center of the yoke part 22*c*. A pair of detent torque reducing coils 2*a* and 2*b* for reducing the detent torque are disposed at bridges 22*a* and 22*b*, respectively, of the yoke 22 of the stator 21. At the time of sweep drive, as illustrated in FIG. 6, a DC current is applied from a p-type MOS 61 with a gate 61*a* to the detent torque reducing coils 2*a* (60*a*) and 2*b* (60*b*) connected in series in order to reduce the detent torque, and a DC magnetic field due to the DC current is in a clockwise direction 20*a* or 20*b*. Alternatively, it is also possible that the DC magnetic field be in an anticlockwise direction. The rotation direction of the rotor 25 is an anticlockwise direction 25*a*. Static angles 25*b* and 25*c* of the rotor 25 due to the detent torque and zero crossing angles 25*d* and 25*e* of a back electromotive voltage generated in a coil 17*a* of a stepping motor 17 illustrated in FIG. 1 are indicated.

A rotor of the stepping motor according to the present invention, illustrated in FIG. 3, will be described. A rotor 3 according to the present invention has a rotor shaft 3*a*, and the rotor shaft 3*a* is provided with an inertia 3*d* with a circular disc shape in addition to a pinion 3*b* and a permanent magnet 3*c*.

Figure 4:
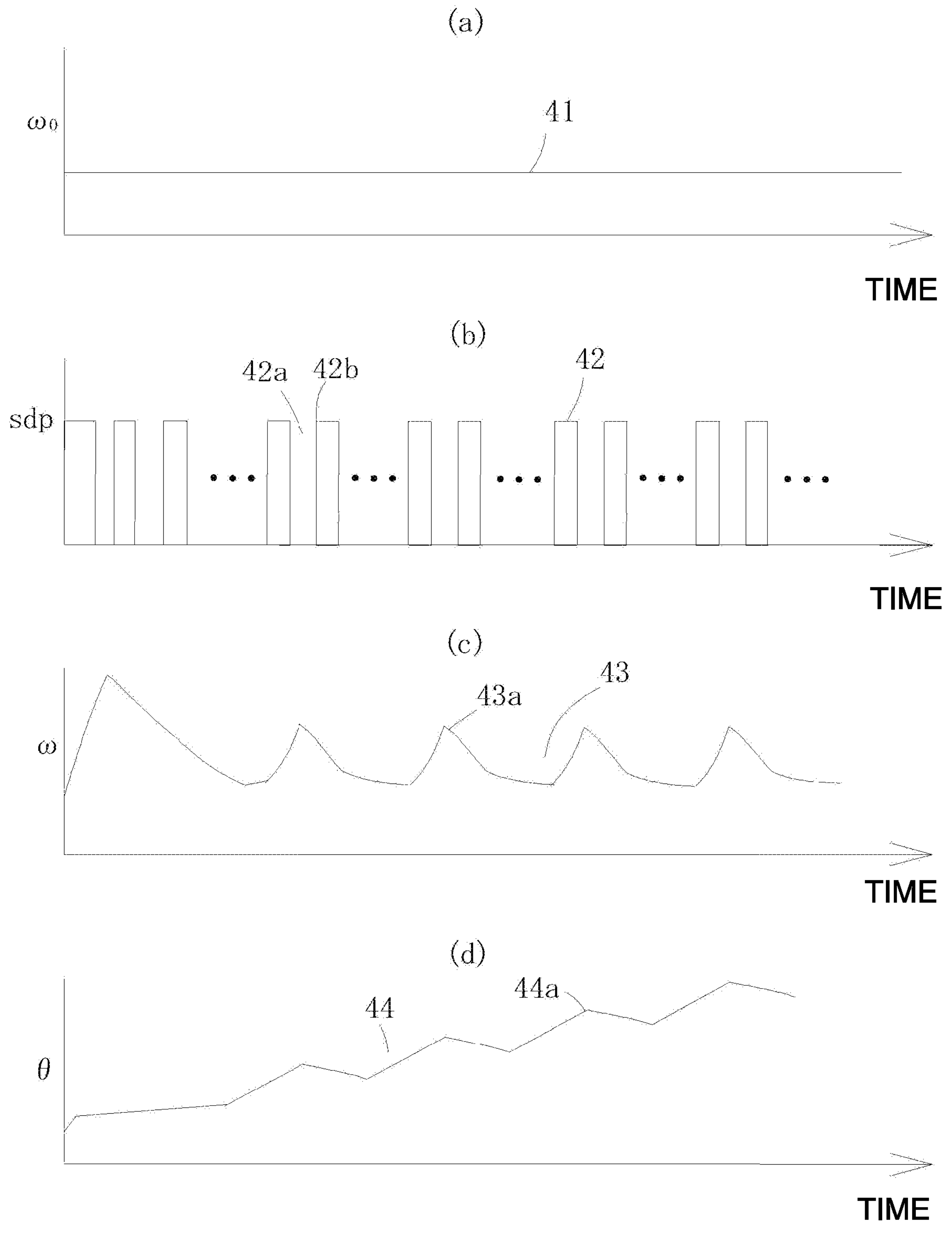
FIG. 4 is a time change diagram of set angular velocity (a), a sweep drive pulse (b), angular velocity (c), and an angle (d) according to the present invention.

The embodiment of the present invention will be described with use of a drive circuit diagram of the stepping motor according to the present invention illustrated in FIG. 1, time change diagrams of set angular velocity (a), a sweep drive pulse (b), angular velocity (c), and an angle (d) according to the present invention illustrated in FIG. 4, a driver diagram according to the present invention illustrated in FIG. 5, and a driver diagram of the detent torque reducing coils according to the present invention illustrated in FIG. 6.

A drive circuit 1 of the stepping motor according to the present invention is configured from step drive/sweep drive switching means 10, and a sweep drive circuit 11 and step drive pulse generating means 12 that are switched by the step drive/sweep drive switching means 10, a driver A 16, and a driver B 20. Further, in FIG. 1, the stepping motor 17 (STM), the coil 17*a*, and detent torque reducing coils 20*b* and 20*c* connected in series are illustrated.

First, step drive will be described. The step drive pulse generating means 12 outputs a drive pulse 12*a* to the driver A 16 by the step drive/sweep drive switching means 10. A drive current is applied to the coil 17*a* for the STM 17 and the stepping motor STM 17 makes step rotation.

Figure 5:
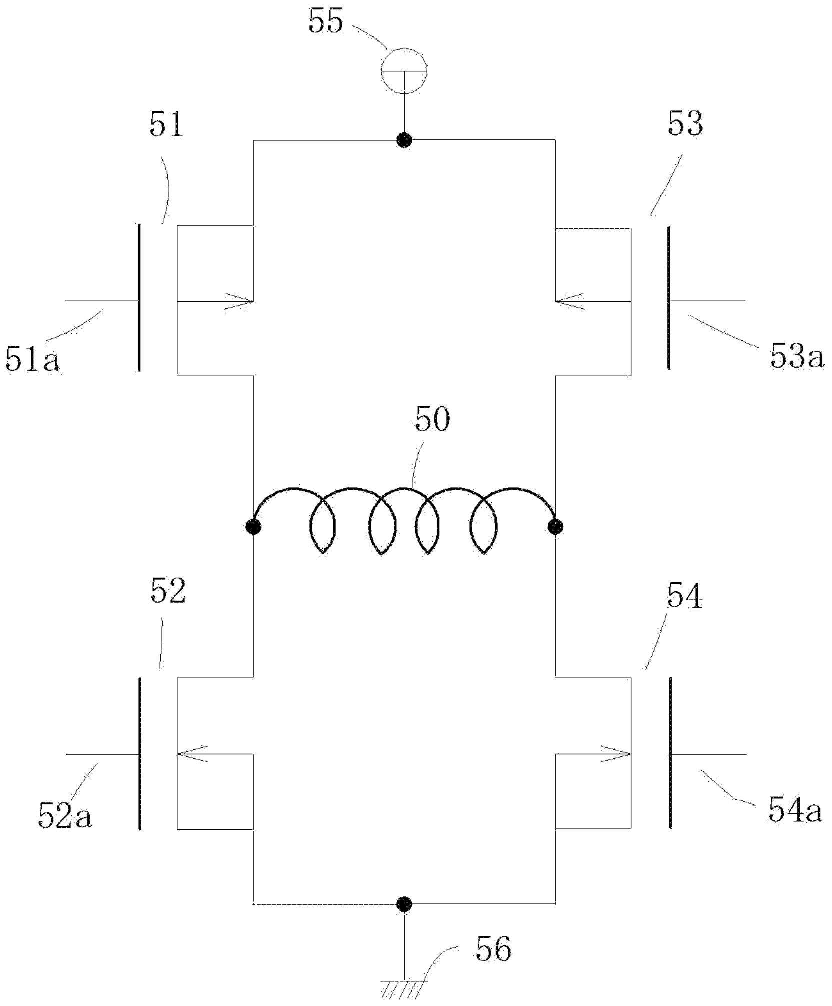
FIG. 5 is a driver diagram according to the present invention.

In FIG. 5, the driver A 16 illustrated in FIG. 1 is push-pull connected to a coil 50 (17*a*) by a p-type MOS 51 having a gate 51*a*, an n-type MOS 52 having a gate 52*a*, a p-type MOS 53 having a gate 53*a*, and an n-type MOS 54 having a gate 54*a*. In the step drive, at the time of drive-off, with respect to a power supply 55 and a ground 56, the gate 51*a* is at the low level and the p-type MOS 51 is turned on. Further, the gate 52*a* is at the low level and the n-type MOS 52 is turned off, the gate 53*a* is at the low level and the p-type MOS 53*a* is turned on, and the gate 54*a* is at the low level and the n-type MOS 54 is turned off.

Next, sweep drive will be described. Due to output of the step drive/sweep drive switching means 10, a set angular velocity/initial angle/initial drive pulse width command 13 of the sweep drive circuit 11 outputs an initial drive pulse width 13*a*, set angular velocity 13*b*, and an initial angle 13*c*. The initial angle 13*c* is decided through input of the output 12*a* of the step drive pulse generating means and determination of whether the static position is the static position 25*b* or 25*c* of the rotor 25 of a stepping motor 2 illustrated in FIG. 2 from the immediately-previous output 12*a*. Angular velocity 19*b*, an angle 19*c*, a drive current 19*e*, and a drive pulse width 142*a* are input to an STM model 19. The STM model 19 executes simulation in real time and outputs angular velocity 19*a*, the angle 19*c*, and a drive current 19*d* at a timing 42*b* immediately before the end of a pause period 42*a* of a sweep drive pulse in the sweep drive pulse (b) illustrated in FIG. 4, which is after a predetermined time from the drive pulse width 142*a*. The angular velocity 19*a* and the drive current 19*d* become the angular velocity 19*b* and the drive current 19*e* through LPFs (low-pass filters) 191 and 192, respectively. Meanwhile, the angular velocity 19*a* is input to a subtractor 141 and becomes a signal 141*a* through subtraction of the set angular velocity 13*b*. The signal 141*a* is input to a proportional integrator 15. In the proportional integrator 15, an output 15*b* of a proportional unit 15*a* having a proportionality constant KP and an output 15*d* of an integrator 15*c* having an integration constant KI are input to an adder 15*e*. An adder 142 adds an output 15*f* of the adder 15*e* and the initial drive pulse width 13*a*, and the sweep drive pulse width 142*a* is generated. The sweep drive pulse width 142*a* is input to the STM model 19 and simultaneously is input to a sweep drive pulse generating circuit 190 to which the angle 19*s* is input. The sweep drive pulse generating circuit 190 inputs, to the driver A 16, a sweep drive pulse 190*a* based on the sign of the sweep drive pulse width 142*a* and whether the angle 19*c* is in a range from 0 to $\pi$ radians or in a range from $\pi$ to $2\pi$ radians, and a drive current is applied to the coil 17*a* and sweep drive of the stepping motor STM 17 is caused.

Functions of the stepping motor STM model 19 will be described. At the time of the sweep drive pulse, the STM model 19 calculates the following two equations in real time.

$$J\cdot d^2\theta/dt^2 + r\cdot d\theta/dt = K\cdot i\cdot\sin\theta - Ts\cdot\sin\{2\cdot(\theta-\theta_0)\} - T_L$$

$$L\cdot di/dt + K\cdot\sin\theta\cdot d\theta/dt + R\cdot i = V - Vs(i)$$

Here, in the former equation, J is the inertia moment of the rotor, θ is the rotor angle, t is the time, r is a friction coefficient, K is a torque constant, i is the coil current, Ts is a detent torque constant, $\theta_0$ is the detent torque equilibrium stability angle of the rotor, and $T_L$ is the load torque. In the latter equation, L is the self-inductance of the drive coil, K is a back electromotive voltage constant (same as the torque constant), R is the drive coil resistance, V is a supply voltage, and Vs(i) is the drop voltage of the drive MOS. The sign of the supply voltage V is determined depending on which combination is obtained from four combinations of the sign of the sweep drive pulse width 142*a* and whether the rotor angle θ is in a range from 0 to π radians or in a range from π to 2π radians.

At the time of stop of the drive pulse, the STM model 19 calculates the following two equations in real time.

$$J\cdot d^2\theta/dt^2 + r\cdot d\theta/dt = K\cdot i\cdot\sin\theta - Ts\cdot\sin\{2\cdot(\theta-\theta_0)\} - T_L$$

$$L\cdot di/dt + K\cdot\sin\theta\cdot d\theta/dt + Roff\cdot i = 0$$

Here, corresponding to turning-off of the driver A illustrated in FIG. 1, R is changed to Roff, and Rff is set to $10^3$ times of R, for example.

In the stop time of the sweep drive pulse width 142*a*, the gate 51*a* of the p-type MOS is at the high level, the gate 52*a* of the n-type MOS is at the low level, the gate 53*a* of the p-type MOS is at the high level, and the gate 54*a* of the n-type MOS 54 is at the low level. Thus, all MOSs are turned off. In the stop time of the drive pulse width 142*a*, zero crossing angle detection 18 detects the zero crossing angle from a back electromotive voltage generated across the coil 17*a* based on voltages 18*a* and 18*b* of both ends of the coil 17*a*, and inputs, to the STM model 19, a zero crossing angle 18*c* (the zero crossing angle 18*c* becomes either the angle 25*d* or 25*e* of the rotor 25 of the stepping motor 2 illustrated in FIG. 2, and is discriminated depending on which of the rising and the falling of the back electromotive voltage the zero crossing is obtained at) and corrects the load torque IL at every 180 degrees using the following expression.

$$T_L = -J\cdot d^2\theta/dt^2 - r\cdot d\theta/dt - Ts\cdot\sin\{2\cdot(\theta-\theta_0)\}$$

Next, the time change diagrams of the set angular velocity command (a), the sweep drive pulse (b), the angular velocity (c), and the angle (d) according to the present invention, illustrated in FIG. 4, will be described. In the angular velocity command (a), the set angular velocity command $\omega_0$ 13*a* output by the set angular velocity/initial angle/initial drive pulse width command 13 of the sweep drive circuit 11 illustrated in FIG. 1 becomes π [radians/second] 41 because the reduction gear train ratio is set to 1/30. In the sweep drive pulse (b), the STM model 19 outputs the angular velocity 19*a*, the angle 19*c*, and the current 19*d* at the timing 42*b* immediately before the end of the stop period 42*a* of a sweep drive pulse sdp 42. In the angular velocity (c), the angular velocity ω exhibits a time change 43. At the angle at which the detent torque is generated, the angular velocity ω deviates from π [radians/second] and exhibits a mountain-shaped time change 43*a*. In the angle (d), the angle θ exhibits a time change 44 and a mountain-shaped time change 44*a* is caused at the angle at which the detent torque is generated. The control performance of the angular velocity at the time of sweep is approximately 1% of the set angular velocity command $\omega_0$. Against losing or gaining of the seconds hand, a GPS time signal or a long-wave time signal is received to execute time correction as needed.

Figure 3:
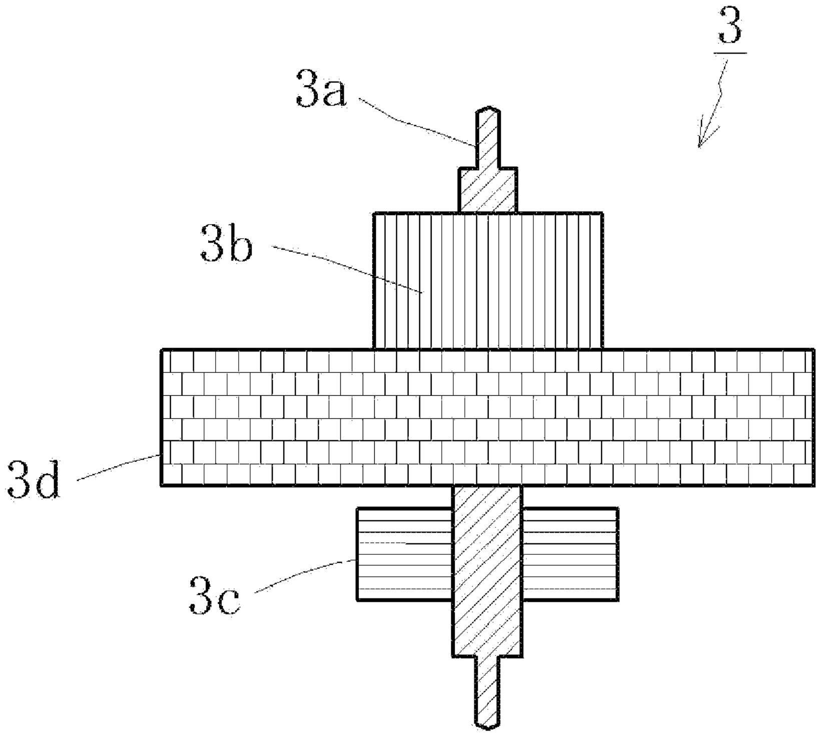
FIG. 3 is a sectional view of a rotor of the stepping motor according to the present invention.
Figure 7:
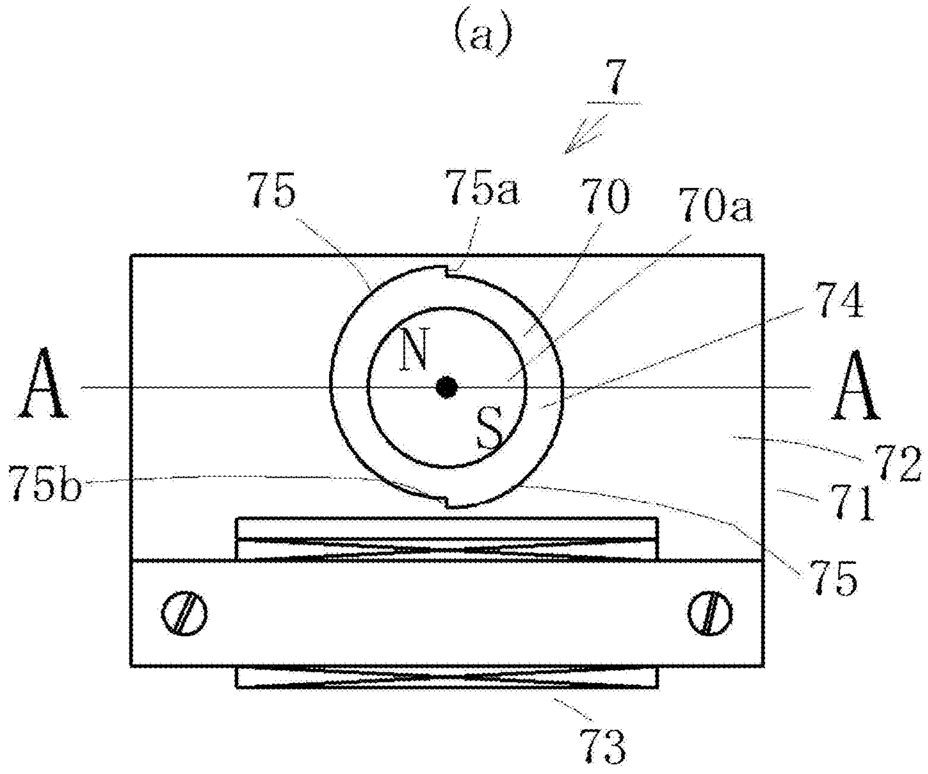
PRIOR ART FIG. 7
FIG. 7 is a plan view (a) and a sectional view (b) along line A-A regarding a conventional stepping motor.
Figure 7:
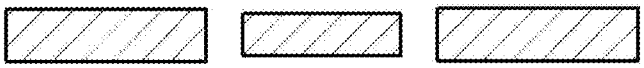
PRIOR ART FIG. 7
Figure 8:
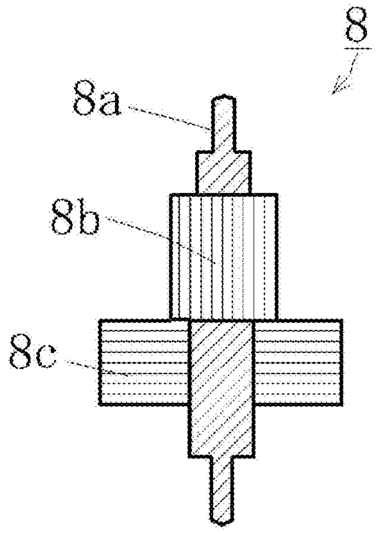
PRIOR ART FIG. 8
FIG. 8 is a sectional view of a rotor of the conventional stepping motor.
Figure 9:
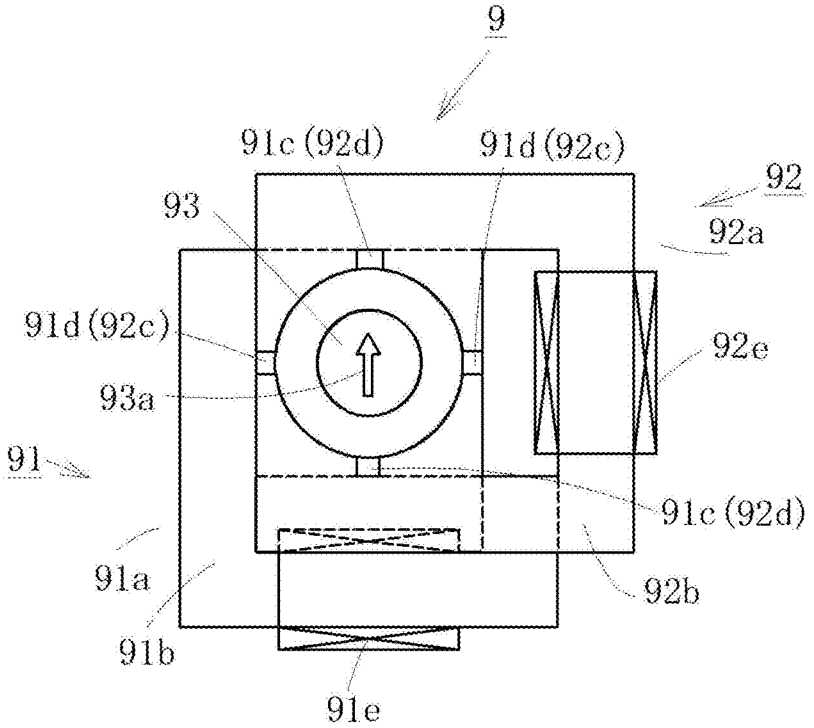
PRIOR ART FIG. 9
FIG. 9 is a configuration diagram of a stepping motor of a conventional analog electronic timepiece.

The inertia moment J of the rotor 3 according to the present invention, illustrated in FIG. 3, is set to approximately 60 times the inertia moment J of the conventional rotor. Furthermore, the steps 24*a* and 24*b* for generating the detent torque of the stepping motor 2 according to the present invention illustrated in FIG. 2 are set to ½ of the steps 75*a* and 75*b*, respectively, of the conventional stepping motor illustrated in FIG. 7. Moreover, the thickness of the part that generates the detent torque is set to 1/2.5 and the detent torque is set to approximately ⅕ of the detent torque of the conventional stepping motor 7. Furthermore, at the time of sweep drive, the gate 61 illustrated in FIG. 6 is set to the low level and the p-type MOS 61 is turned on to apply a DC current to the detent torque reducing coils 2*a* (20*b*, 60*a*) and 2*b* (20*c*, 60*b*) that are disposed at the bridges 22*a* and 22*b* of the yoke 22 and are connected in series. Thereby, a magnetic field is applied in the circumferential direction of the rotor hole and the detent torque is set to further ½. Thus, the detent torque is set to ⅒ of the detent torque of the conventional stepping motor 7 in total.

INDUSTRIAL APPLICABILITY

As illustrated by the above detailed description, according to the electronic timepiece of the present invention, step motion second and sweep motion second are possible with only one stepping motor compared with the conventional electronic timepiece using two stepping motors. As an analog electronic timepiece, a wrist watch, table clock, wall clock, or the like is possible.

DESCRIPTION OF REFERENCE CHARACTERS

1: Drive circuit
11: Sweep drive circuit
12: Step drive pulse generating means
19: STM model
190: Sweep drive pulse generating circuit
2, 7, 9, 17: Stepping motor
3, 8, 25, 70, 93: Rotor
21, 71, 91*a*, 92*a*: Stator
22, 72, 91*b*, 92*b*: Yoke
24, 50, 73, 91*e*, 92*e*: Coil
2*a*, 2*b*, 20*b*, 20*c*, 60*a*, 60*b*: Detent torque reducing coil
23: Detent torque part
24*a*, 24*b*, 75*a*, 75*b*: Step
91*d*, 92*d*: Inner notch

The invention claimed is:

1. An analog electronic timepiece that has a step motion second function and a sweep motion second function, and executes step drive and sweep drive of a stepping motor configured from a rotor and a stator, the rotor including a permanent magnet with two poles and an inertia ring, the stator including a monolithic plate-shaped yoke having a rotor hole that the rotor enters, and a coil fixed to the yoke, the yoke being magnetically coupled to the rotor and including a detent torque part including a structure that generates detent torque and a yoke part excluding the detent torque part, the detent torque part being thinner than the yoke part and being located at a center of the yoke part in thickness direction of the yoke part, wherein the sweep motion second function is achieved by:

executing a simulation using a stepping motor model defined by equations (1) and (2) below;

calculating a sweep drive pulse width for the coil by adding an output from a proportional integrator to a preset initial drive pulse width, the output being obtained by inputting a difference between an angular velocity of the rotor obtained as one result of the simulation and a set angular velocity of the rotor into the proportional integrator; and executing the sweep drive of the stepping motor by angular velocity control based on the calculated sweep drive pulse width and an angle of the rotor obtained as another result of the simulation, $$J \cdot d^2\theta / dt^2 + r \cdot d\theta / dt = K \cdot i \cdot \sin\theta - T_s \cdot \sin\{2 \cdot (\theta - \theta_0)\} - T_L \quad \text{equation (1)}$$

$$L \cdot di / dt + K \cdot \sin\theta \cdot d\theta / dt + R \cdot i = V - Vs(i) \quad \text{equation (2)}$$

in the equation (1), J being an inertia moment of the rotor, θ being an angle of the rotor, t being a time, r being a friction coefficient of the rotor, K being a torque constant, i being a current of the coil, $T_s$ being a detent torque constant, $\theta_0$ being an equilibrium stability angle of the rotor by a detent torque, and $T_L$ being a load torque, in the equation (2), L being a self-inductance of the coil, K being a back electromotive voltage constant and equal to the torque constant, R being a resistance of the coil, V being a supply voltage of a drive circuit of the stepping motor, and Vs (i) being a voltage loss of the drive circuit, wherein the simulation of the stepping motor model includes steps of:

performing a first calculation step to compute an angle of the rotor, an angular velocity of the rotor, and a current of the coil by inputting the set angular velocity, the initial drive pulse width, and an initial angle of the rotor into the stepping motor model;

performing a second calculation step to compute the angle of the rotor, the angular velocity of the rotor, and the current of the coil by inputting the sweep drive pulse width obtained through the proportional integrator into the stepping motor model, together with the angle of the rotor, the angular velocity of the rotor, and the current of the coil obtained as simulation results of the stepping motor model; and repeatedly performing the second calculation step until the sweep motion second function is off.

2. The analog electronic timepiece according to claim 1, wherein the load torque of the stepping motor model is corrected at every 180 degrees using the angular velocity of the rotor obtained as one result of the simulation of the stepping motor model, and a zero crossing angle of the rotor detected from a back electromotive voltage generated across the coil.

3. The analog electronic timepiece according to claim 1, wherein detent torque reducing coils for reducing detent torque are disposed at bridges near the rotor hole of the stator of the stepping motor, and a DC current is applied to the detent torque reducing coils and the detent torque is reduced at time of the sweep drive.

4. The analog electronic timepiece according to claim 1, wherein, after an end of the sweep motion second function, a GPS time signal or a long-wave time signal is received, and deviation of a seconds hand is corrected.

* * * * *